(12) United States Patent
Kurihara et al.

(10) Patent No.: US 6,330,391 B1
(45) Date of Patent: Dec. 11, 2001

(54) VTR SIGNAL PROCESSING CIRCUIT

(75) Inventors: Takashi Kurihara, Gunma-ken;
Yoshihisa Ichikawa, Tamamura-machi;
Izumi Arai, Takasaki; Naoki Kurabayashi, Fujioka; Hiroshi Kuramoto; Tsuyoshi Muroya, both of Yokohama, all of (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/037,305

(22) Filed: Mar. 9, 1998

(30) Foreign Application Priority Data

Mar. 10, 1997 (JP) ................................... 9-072620

(51) Int. Cl.[7] ............................. H04N 5/911; H04N 5/91
(52) U.S. Cl. ................................ 386/21; 386/17; 386/18
(58) Field of Search ................................ 386/21, 22, 24, 386/25, 31, 34, 1, 41, 44, 2, 17, 18, 113, 114, 115, 46, 47, 85, 88, 89; H04N 5/911, 5/91

(56) References Cited

U.S. PATENT DOCUMENTS 4,772,961 * 9/1988 Ichinoi ................................. 360/9.1
5,500,739 * 3/1996 Strolle et al. ......................... 386/21
5,526,126 * 6/1996 Furihata et al. ...................... 386/22

* cited by examiner

Primary Examiner—Robert Chevalier
(74) Attorney, Agent, or Firm—Anderson, Kill & Olick P.C.

(57) ABSTRACT

In a VTR signal processing circuit, a first reproduced color under signal and a second reproduced color under signal obtained by delaying by one or two horizontal period in synchronism with a predetermined clock signal are supplied to the first and second frequency converter circuits 1 and 2 respectively, a frequency signal having frequency 2n times that of a carrier used in frequency conversion for converting a frequency of the reproduced color under signal into a frequency corresponding to a standard color signal is produced by an oscillator circuit, this oscillation frequency is divided such that it becomes the above mentioned carrier frequency, four carriers having phases 0 degree, 90 degrees, 180 degrees, and 270 degrees respectively are produced, the four carriers are selectively output and supplied to the first and second frequency converter circuits 1 and 2 such that an output signal of the first frequency converter circuit 1 and an output signal of the second frequency converter circuit 2 become in phase or inverted phase, and a color cross-talk between tracks is removed by adding the both output signals or subtracting one of the output signals from the other, the clock generator circuit 22 for generating a clock signal in synchronism with a horizontal sync signal separated from a reproduced luminance signal is provided and the delaying operation of the delay circuit is controlled by this clock signal.

4 Claims, 6 Drawing Sheets

VTR SIGNAL PROCESSING CIRCUIT

BACKGROUND OF THE INVENTION

1. Field of the Invention

The present invention relates to a VTR (Video Tape Recorder) signal processing circuit and, particularly, relates to a technique which is effectively used in a device including a frequency converter portion of a double main converter system which removes color cross-talk contained in a reproduced color under signal by using two frequency converter circuits and a delay circuit such as a CCD (Charge-Coupled Device).

2. Description of the Related Art

FIG. 5 is a block diagram of a frequency converter portion of a conventional double converter system of the prior art.

FIG. 6(a) is a waveform diagram of a conventional delaying operation of color under signal of the prior art when it operates stably.

FIG. 6(b) is a waveform diagram of a conventional delaying operation of color under signal of the prior art with corresponding to a variation of rotation speed of a motor.

In a home used VTR (Video Tape Recorder), a color video signal is recorded according to the color under system. In this system, a luminance signal is frequency-modulated, a color signal is frequency converted to a frequency band lower than the frequency-modulated luminance signal and the both are recorded on a slanted track of a magnetic tape by a rotary video head.

In a recent VTR, a guard-band-less system is used for increasing the recording density and cancel of cross-talk caused by the guard-band-less system is indispensable. The cancel of cross-talk is performed by providing azimuth angle to the video head. However, although the effect of azimuth angle is effective for a high frequency signal, it is less effective for low frequency signal. That is, the effect of cross-talk cancel is small for the color signal and, therefore, the phase shift color system (PS color system) or phase invert color system (PI color system) is employed.

The method for cancelling color cross-talk in the color under system will be described by using the NTSC format of the VHS system. A video recording track is recorded by repeating two channels, a channel 1 and a channel 2, alternately. In the VHS system NTSC format, a color under frequency is 40 times the horizontal scan frequency (40 $f_H$). Therefore, the recording is performed by frequency converting a standard color signal frequency (color sub-carrier frequency) of 3.579545 MHz into 40 $f_H$, about 629 kHz, with phase thereof in the channel 1 being advanced by 90 degrees every horizontal period and in the channel 2 being delayed by 90 degrees every horizontal period. With this phase shifting, a cross-talk component can be cancelled by, in a reverse conversion of the color signal of 629 kHz into that of 3.579545 MHz during reproduction, adding the color signal before delaying and the color signal delayed by a one horizontal period by using a delay element of one horizontal period.

When the delay element is one using a glass delay line, there is a problem since the glass delay line itself is a relatively large component part in mounting on a circuit board and is expensive. When the delay element is one using a CCD (Charge-Coupled Device), the CCD which operates with a clock 3 or 4 times the color sub-carrier frequency of 3.579545 MHz is required and further a phase adjustment to make a total delay amount of the CCD and a low-pass filter or a band-pass filter provided subsequently to the CCD exactly one horizontal period is necessary.

In view of this, a VTR signal processing circuit shown in FIG. 5, which has a simple construction and makes a reproducing frequency conversion possible while cancelling the color cross-talk, has been proposed. Taking a reproducing color signal processing circuit of a VTR of the VHS system of 3.58 NTSC system as an example, the color under signal having frequency of 40 fh, wherein fh stands for horizontal sync frequency, on one hand, is converted into a standard color signal by a frequency converter (1) circuit (main converter) 101. This converter circuit is a kind of the balanced modulator circuit for obtaining, when a frequency of a converted signal is sufficiently higher than a frequency of an input signal, a sum frequency component and a difference frequency component of the input signal frequency and the sufficiently high frequency. The color under signal is delayed by a CCD 103 by one horizontal period (two horizontal periods in the PAL system) and is frequency converted by the other frequency converter (2) circuit 102. A comb type filter is constituted by adding the standard color signal whose phase are made opposite by the two frequency converter circuits 101 and 102 by an adder circuit 104.

The carrier frequency of about 4.21 MHz for the above mentioned frequency conversion is produced by comparing in phase the color signal derived from the band-pass filter (BPF) 105 with a reference frequency signal produced by crystal oscillator circuit (VXO) 109 by a phase detector 108, producing an oscillation frequency signal (535 fh, about 8.42 MHz) which is twice the carrier frequency for the VTR recording and reproduction by controlling a voltage control oscillator (VCO) 107 according to a result of phase detection and dividing it by two by a frequency divider 111, and the above mentioned two frequency converted signals are made opposite by shifting the phase of the output of the frequency divider by 90 degrees. When the frequency converted signals are made in phase, the color cross-talk between adjacent tracks is cancelled by not addition but subtraction. Such double main converter system is proposed in Japanese Patent Application Laid-open No. H7-99671. In this double main converter system, the clock frequency of the delay circuit composed of CCD, etc., for delaying the color under signal may be low and can be realized without adjustment.

In such double converter system as mentioned above, there may be a possibility that an image quality is temporarily degraded or color is lost in relation to a response of a rotation speed of a drum motor mounted with a head when an operation is shifted to a special reproducing mode, wherein the special reproduction mode is mode shift to a search, slow, or still, etc. The reason for that is as follows: in the construction which uses a frequency which is twice the oscillation frequency of the VXO 109 obtained by a frequency multiplier circuit (x2) 110 as the clock signal of the pCD 103 for producing the delay signal of the above mentioned one horizontal period (1H), it is possible to obtain an exact delay time corresponding to the normal 1H when it operates stably as shown in FIG. 6(a). However, the phase is shifted correspondingly to a variation of rotation speed of a motor and the delay signal due to the CCD 103 which is kept the normal 1H, as shown in FIG. 6(b). With this phase shift, the cancelling effect of cross-talk from adjacent tracks is degraded causing the image quality to be degraded and, when the phase is inverted, the signal component is cancelled resulting in a color-less image.

SUMMARY OF THE INVENTION

Accordingly, an object of the present invention is to provide a VTR (Video Tape Recorder) signal processing circuit which makes a cross-talk cancelling operation possible stably even in a shifting to a special reproducing mode.

In a VTR signal processing circuit including a frequency converter portion in which a first reproduction color under signal and a second reproduction color under signal obtained by delaying by one or two horizontal period in synchronism with a predetermined clock signal are supplied to a first and second frequency converter circuits respectively. A frequency signal having frequency 2n times that of a carrier used in frequency conversion for converting a frequency of the reproduced color under signal into a frequency corresponding to a standard color signal is produced by an oscillator circuit. This oscillation frequency is divided such that it becomes the above mentioned carrier frequency. Four carriers having phase 0 degree, 90 degrees, 180 degrees, and 270 degrees respectively are produced. The four carriers are selectively output and supplied to the first frequency converter circuit and the second frequency converter circuit and an output signal of the first converter circuit and an output of the second frequency converter circuit become in phase or inverted phase, and a color cross-talk between tracks is removed by adding the both output signals or subtracting one of the output signals from the other. A clock generator circuit for generating a clock signal in synchronism with a horizontal sync signal separated from a reproduced luminance signal is provided and the delaying operation of the delay circuit is controlled by this clock signal.

Other objects and further features of the present invention will be apparent from the following detailed description with respect to preferred embodiments of the invention when read in conjunction with the accompanying drawings.

DETAILED DESCRIPTION OF THE PREFERRED EMBODIMENTS

First Embodiment

Figure 1:
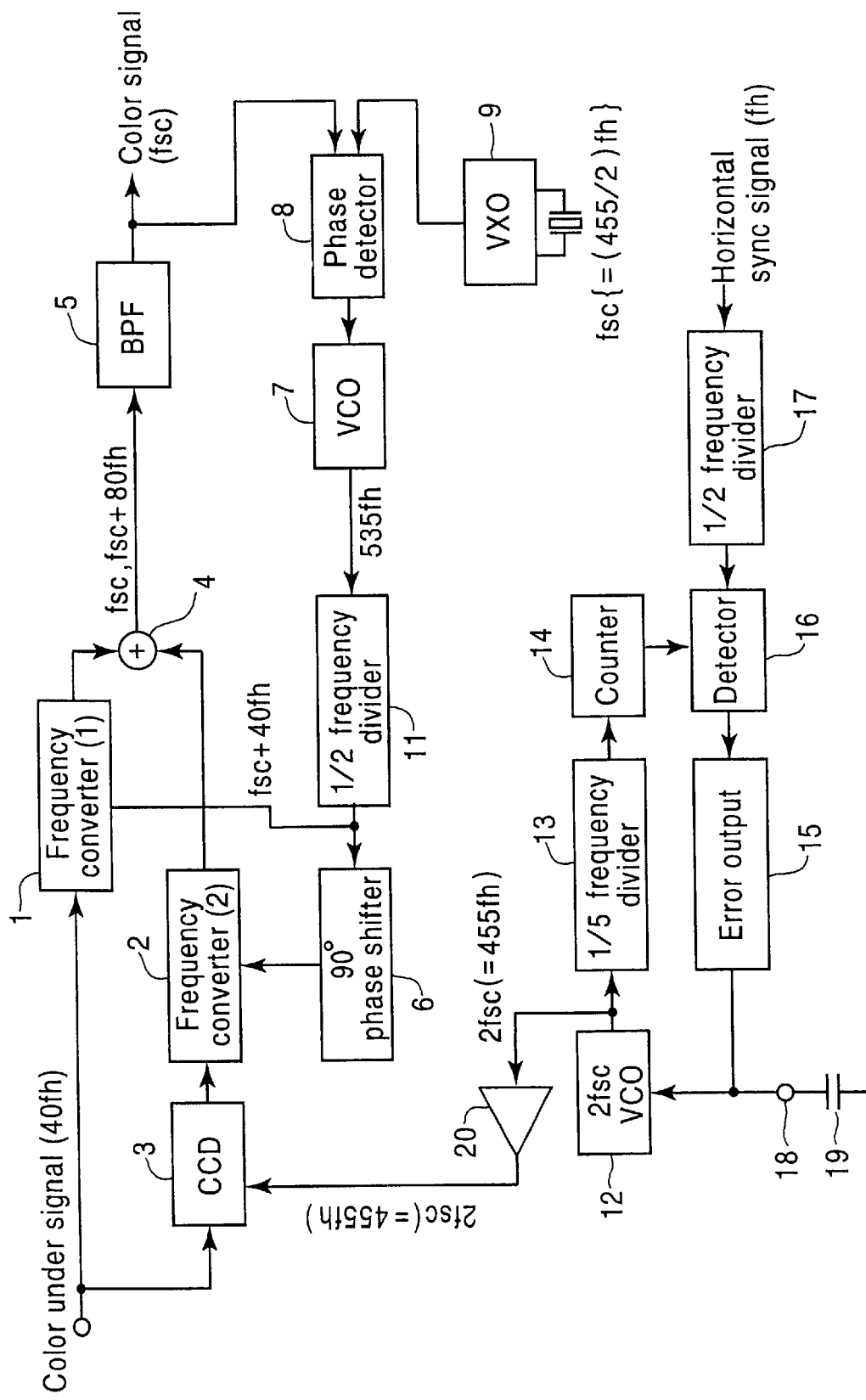
FIG. 1 shows a block diagram of a frequency converter portion included in a VTR (Video Tape Recorder) signal processing circuit according to an embodiment of the present invention.

FIG. 1 is a block diagram of a frequency converter portion included in a VTR (Video Tape Recorder) signal processing circuit according to an embodiment of the present invention.

Figure 2:
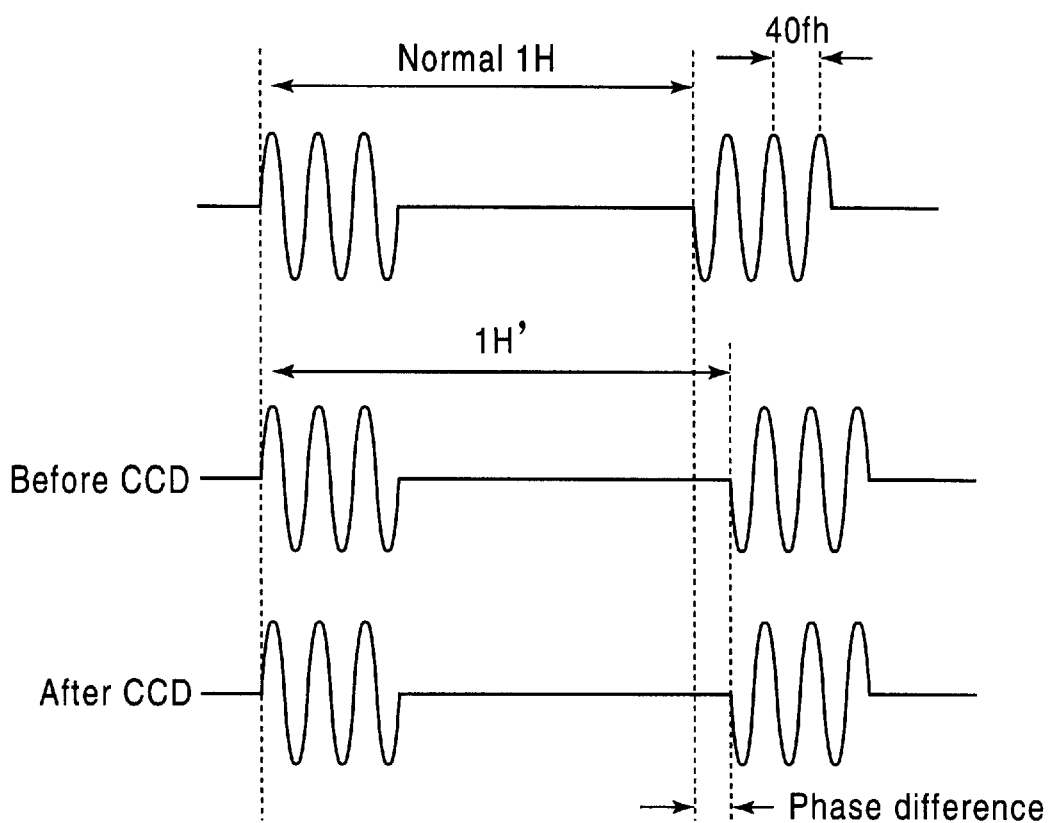
FIG. 2 shows a waveform diagram of a delaying operation of a color under signal according to the embodiment of the present invention.

FIG. 2 is a waveform diagram of a delaying operation of a color under signal according to the embodiment of the present invention.

Figure 3A:
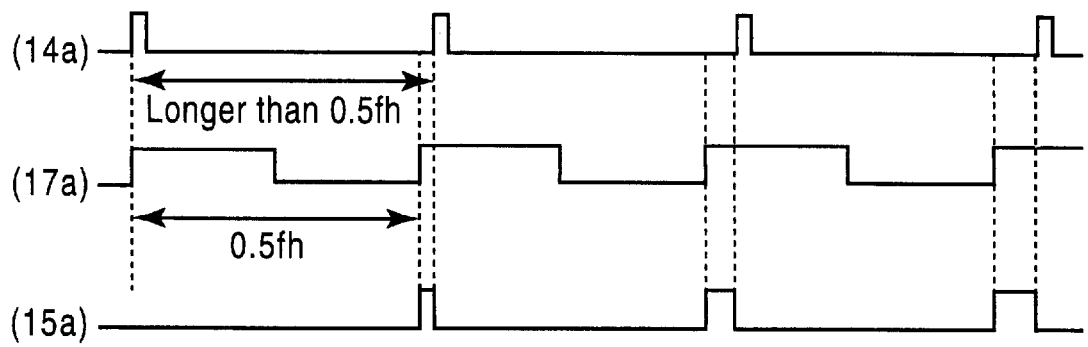
FIG. 3(a) shows a timing chart of a clock generator circuit shown in FIG. 1 used for the delaying operation when a counter output is longer than a period of a ½ frequency output of a horizontal sync signal.

FIG. 3(a) is a timing chart of a clock generator circuit shown in FIG. 1 used for the delaying operation when a counter output is longer than a period of a ½ frequency output of a horizontal sync signal.

Figure 3B:
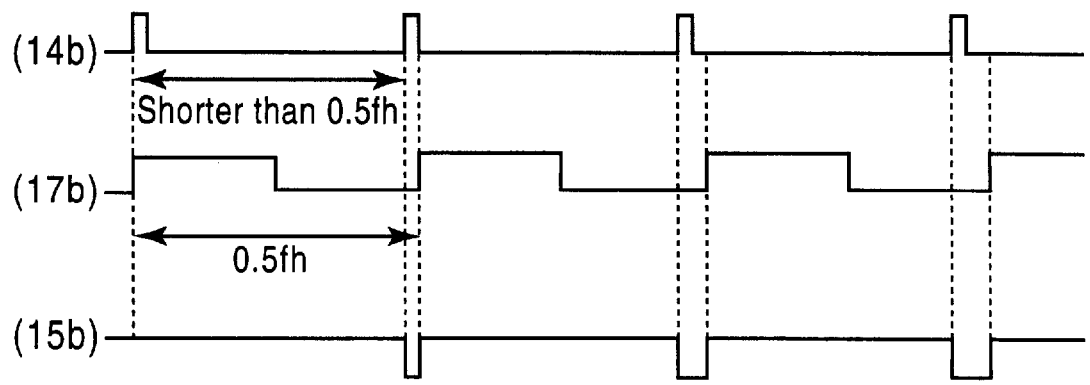
FIG. 3(b) shows a timing chart of a clock generator circuit shown in FIG. 1 used for the delaying operation when a counter output is shorter than a period of a ½ frequency output of a horizontal sync signal.

FIG. 3(b) is a timing chart of a clock generator circuit shown in FIG. 1 used for the delaying operation when a counter output is shorter than a period of a ½ frequency output of a horizontal sync signal.

Figure 4:
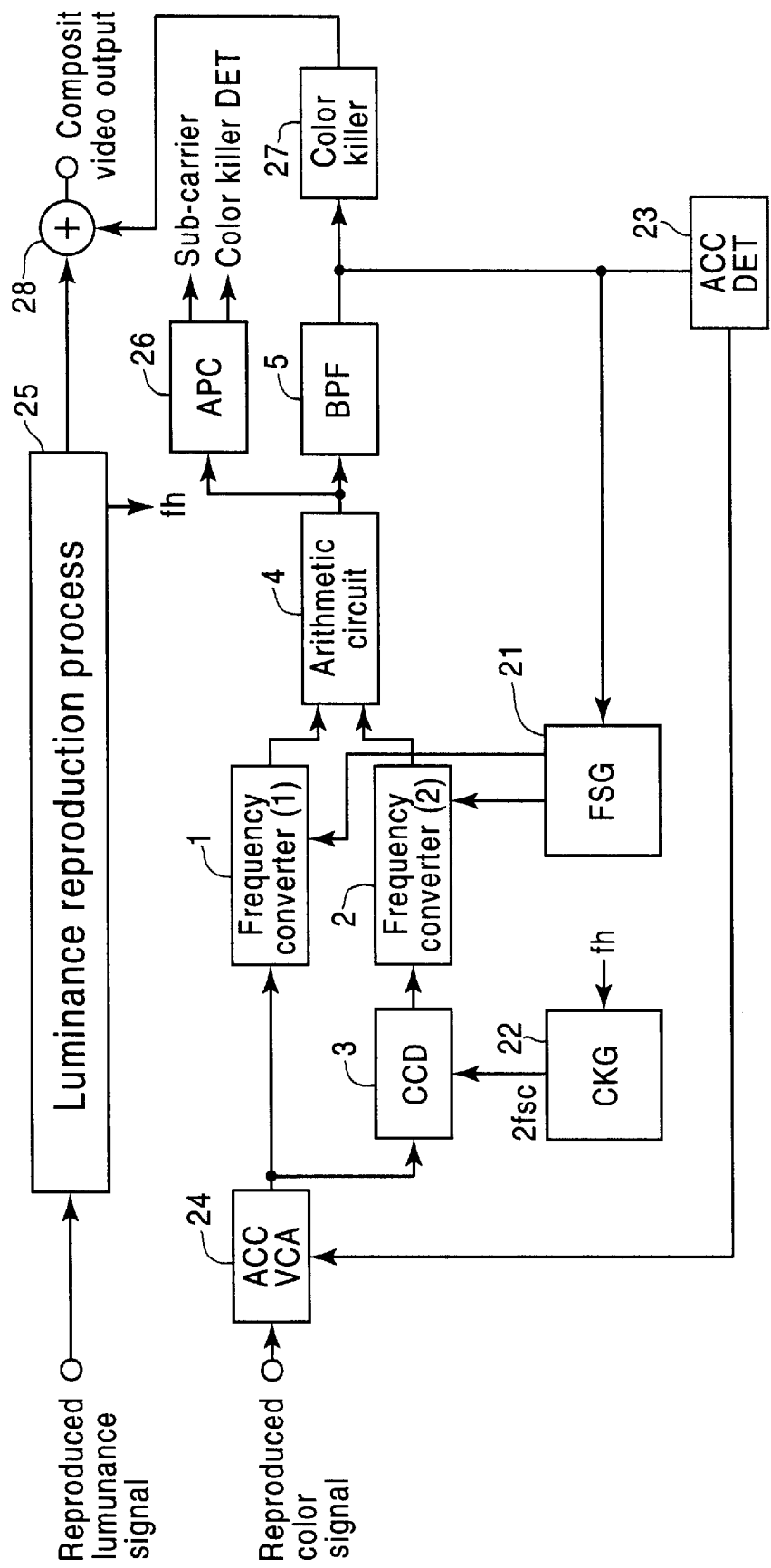
FIG. 4 shows a block diagram of the VTR signal processing circuit according to the embodiment of the present invention corresponding to a reproduction mode thereof.
Figure 5:
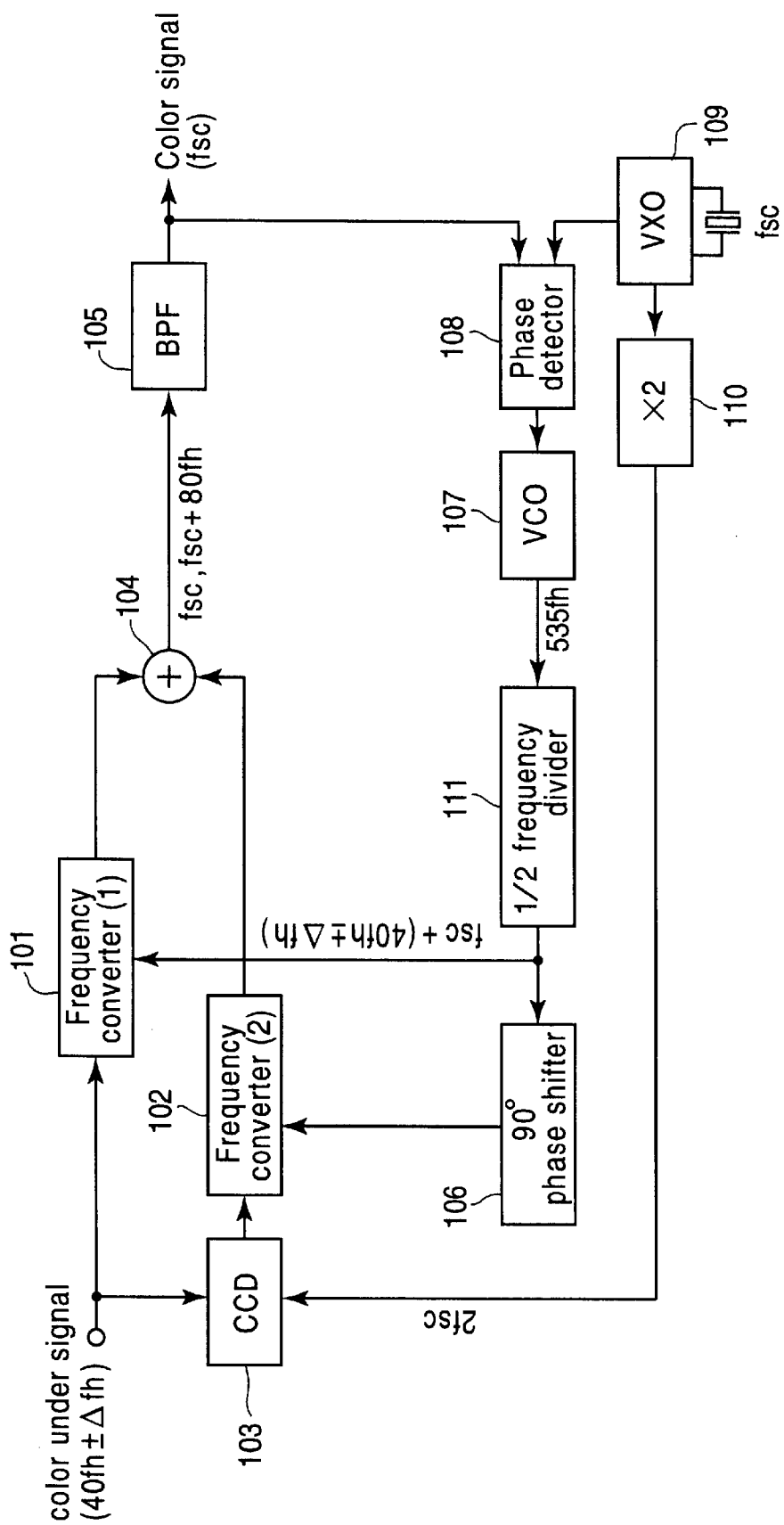
FIG. 5 shows a block diagram of a frequency converter portion of a conventional double converter system of the prior art.
Figure 6A:
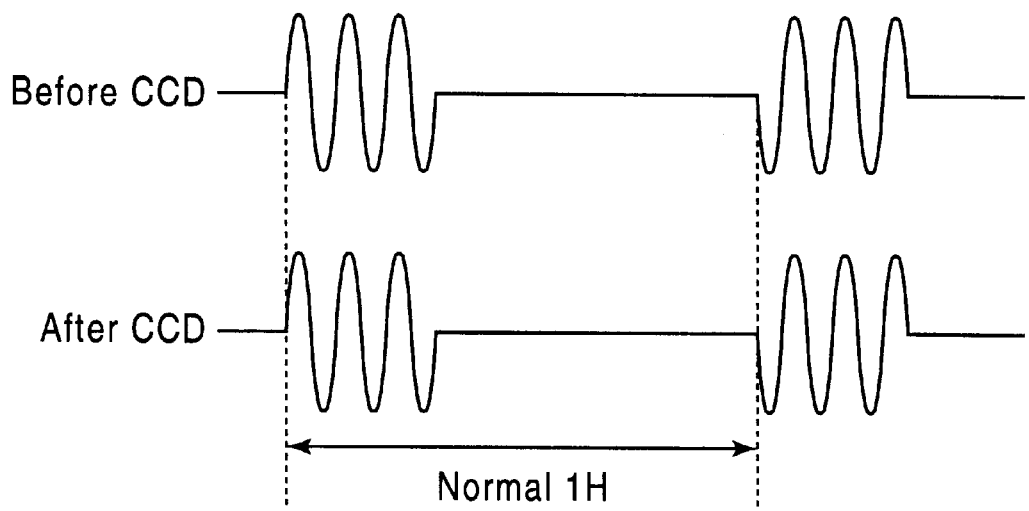
FIG. 6(a) shows a waveform diagram of a conventional delaying operation of color under signal of the prior art when it operates stably.
Figure 6B:
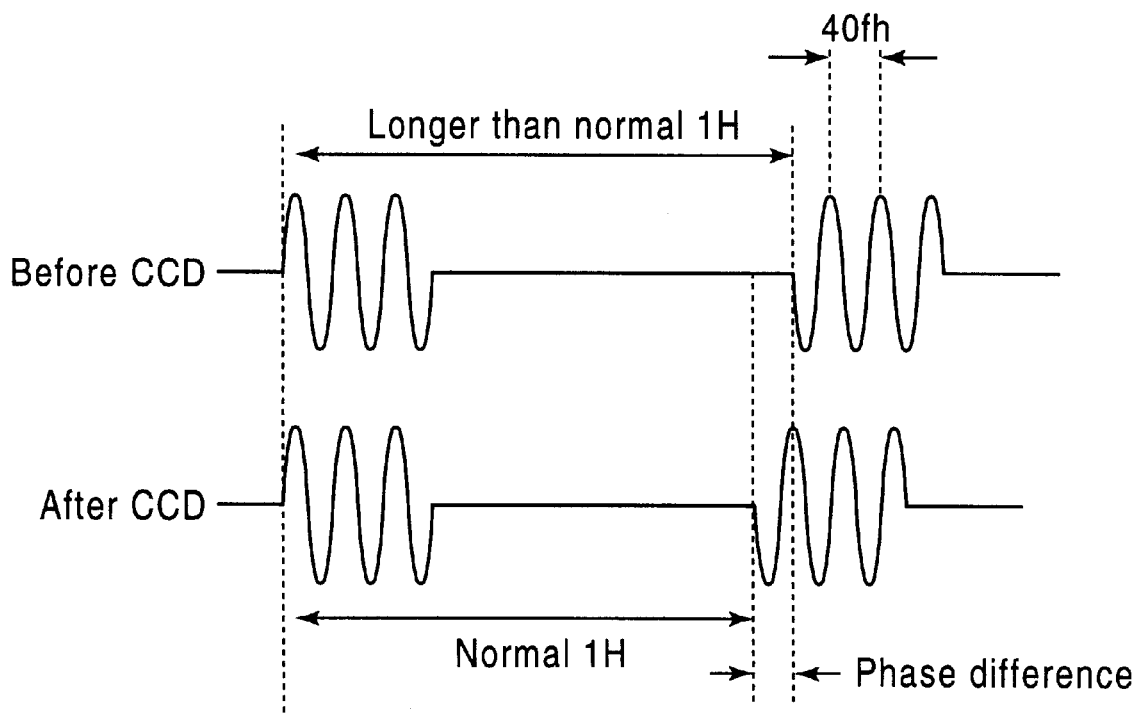
FIG. 6(b) shows a waveform diagram of a conventional delaying operation of color under signal of the prior art with corresponding to a variation of rotation speed of a motor.

FIG. 4 is a block diagram of the VTR signal processing circuit according to the embodiment of the present invention corresponding to a reproduction mode thereof.

As shown in FIG. 1, a circuit block is formed in a single semiconductor substrate of such as mono-crystalline silicon together with other circuit blocks constituting the VTR signal processing circuit by a known semiconductor integrated circuit (IC) fabrication technique. Although not limited specifically, this embodiment is directed to a VTR of the VHS system using a frequency of a color sub-carrier (fsc) of 3.58 MHz.

In FIG. 1, a color under signal converted into a low frequency band signal of 40 fh where fh is a horizontal sync frequency is separated from a reproduced signal by a low-pass filter which is not shown and input. This color under signal is delayed by one horizontal period by a delay circuit composed of a CCD (Charge-Coupled Device) 3 in the case of the NTSC system. The CCD 3 may be replaced by an input portion for performing an analog to digital conversion, a shift register for delaying the digital signal and a digital to analog (D/A) converter circuit for returning the shifted digital signal to the analog signal. The color under signal is input to one input of a first frequency converter circuit 1 and the color under signal delayed by the CCD 3 is input to one input of a second frequency converter circuit 2. The first and second frequency converter circuits 1 and 2 are main converter for converting the color under signal into a standard color frequency.

The signal which is converted into the standard color signal by the first and second frequency converter circuits 1 and 2 is supplied to an arithmetic circuit 4 for cancelling a cross-talk. A band-pass filter (BPF) 5 is provided on an output side of the arithmetic circuit 4 to obtain a pure standard color signal fsc by removing unnecessary frequency component fsc +80 fs produced by the first and second frequency converter circuits 1 and 2.

A sub-carrier for frequency conversion is produced by frequency dividing an oscillation signal of a voltage controlled oscillator circuit (VCO) 7 controlled such that it oscillates at a frequency which is twice that of a sub-carrier which is a carrier for recording and reproduction of VTR, that is, 535 fh (about 4, 12 MHz×2=8.42 MHz) in the NTSC system, by two by a frequency divider circuit 11, producing signals having phases 0 degree, 90 degrees, 180 degrees, and 270 degrees by the frequency divider circuit 11, supplying one of them to the other input of the frequency converter circuit 1 and selecting and supplying one of the output signals of the frequency divider 11 to the second frequency converter circuit 2 by a 90 degrees phase shifter circuit 6. That is, the sub-carrier is selected by the phase shifter circuit 6 such that the standard color signals output from the first and second frequency converter circuits 1 and 2 become in phase or inverted phase.

The VCO 7 produces an oscillation signal corresponding to a color sub-carrier fsc which is equal to 455 fh/2 having frequency of about 3.58 MHz generated by a crystal oscillator circuit (VXO) 9. The oscillation signal and the color signal fsc having frequency of about 3.58 MHz derived by the BPF 5 are compared in phase with each other by a phase detector circuit 8 and a result of the comparison is converted to a DC (Direct Current) signal by a low-pass filter which is not shown to control the oscillation frequency of the VCO 7. Since the sub-carrier 535 fh for the conversion of the frequency of about 8.42 MHz is produced by using such PLL loop, it is possible to produce a color signal corresponding to the color sub-carrier fsc in the frequency converter circuit 1 and 2.

Although omitted in FIG. 1, a gain control circuit is provided on an input side of the frequency converter circuit 1 or 2 in order to make amplitude levels of the reproduced color under signal input to the first frequency converter circuit 1 and the reproduced color under signal delayed by 1H and input to the second frequency converter circuit 2 the same. The input signals of the frequency converter circuits 1 and 2 control the gain control circuit by producing a demodulated baseband signal by using a sub-carrier which is frequency synchronized with a burst signal of a reproduced color signal in a demodulator circuit, detecting a difference in amplitude between the demodulated baseband signals and converting it into a DC voltage by the low-pass filter. Thus, the input amplitude of the reproduced color under signal input to the first frequency converter circuit 1 can be made equal to the input amplitude of the reproduced color under signal delayed by 1H and input to the second frequency converter circuit 2. For such additional circuits, the technique disclosed in the aforementioned Japanese Patent Application Laid-open No. H7-99671 can be utilized.

In this embodiment, in order to perform the cross-talk cancelling operation exactly even when the rotation speed of the drum motor becomes unstable in a shift of the operation of VTR to a special mode reproduction such as search or still, etc., a clock generator circuit to be described is provided. A VCO 12 oscillates at an oscillation frequency of such as 2 fsc which is equal to 455 fh and the oscillation signal is supplied to the CCD 3 through a buffer circuit 20 as a transfer clock. This embodiment is controlled by the PLL loop constituted with the following circuit such that the oscillation frequency of the VCO 12 becomes synchronized with a horizontal sync signal of the reproduced signal, in other word, it follows a frequency of the horizontal sync signal which is changed correspondingly to the rotation speed of the drum motor.

The frequency of the horizontal sync signal fh separated by a luminance reproducing circuit which is not shown is divided by two by a frequency divider circuit 17 and a resultant 0.5 fh is supplied to one input of a detect circuit 16. The detect circuit 16 is a phase comparator circuit for determining a difference in edge timing between two input pulses. The oscillation signal frequency of the VCO 12 is divided by five by a frequency divider 13, counted by a counter circuit 14 and supplied to the other input of the detect circuit 16. The counter circuit 14 produces one pulse every 182 counts. That is, the oscillation signal frequency 455 fh of the VCO 12 is divided by (182×5) to produce the pulse of 0.5 fh.

The counter circuit 14 may be replaced by a frequency divider circuit or may be included in the frequency divider circuit 13. Alternatively, the frequency divider circuit 13 may be included in the counter circuit 14. The detect circuit 16 produces a current signal corresponding to the difference in edge timing between the two input pulses. This current signal is supplied to a capacitor 19 connected through an external terminal 18 to convert it into a DC voltage which is used as a control voltage for the VCO 12.

As shown in FIG. 3(a), when the counter output (14a) is longer than the period which is equal to 0.5 fh of the ½ frequency divider output (17a) of the horizontal sync signal, a positive signal (15a) corresponding to the phase difference is produced. If there is no such PLL loop, the time difference is increased more and more as shown in FIG. 3(a). However, it is possible to realize a synchronization by lowering the oscillation frequency of the VCO 12 by controlling the latter such that the control voltage is lowered by, for example, discharging the capacitor 19 by this error signal (15a).

As shown in FIG. 3(b), when the counter output (14b) is shorter than the period which is equal to 0.5 fh of the ½ frequency divider output (17b) of the horizontal sync signal, a negative signal (15b) corresponding to the phase difference is produced. If there is no such PLL loop, the time difference is increased more and more. However, it is possible to realize a synchronization by increasing the oscillation frequency of the VCO 12 by controlling the latter such that the control voltage is increase by, for example, discharging the capacitor 19 by this error signal (15b). If the oscillation frequency of the VCO 12 is charged in reverse proportion to the control signal, it is enough to produce the control signal which is reverse to that mentioned above.

With the PLL loop as mentioned above, the oscillation frequency 455 fh of the VCO 12 is controlled following the horizontal sync signal. That is, the horizontal sync signal fh is included in the reproduction signal read out from the reproducing head and has jitter corresponding to fluctuation of the rotation speed of the drum motor. Therefore, since, when a reproducing color under signal of one horizontal period 1H' which is longer than the normal 1H shown in FIG. 2 is read out, the clock signal supplied to the CCD 3 is made a clock signal corresponding to one horizontal period 1H' of the reproduced color under signal by the clock generator circuit, it is possible to compensate for a phase difference between the delayed signal after processed by the CCD 3 and the signal before delayed.

The PAL system improves the degradation of image quality for the non-linearity of transmission system compared with the NTSC system. In the PAL system, (R−Y) and (B−Y) are used as color difference signals. The sub-carrier is carrier suppressed and amplitude modulated by the color difference signals. However, phase of the sub-carrier of the (R−Y) signal is inverted every scanning line. The color burst phase is also switched between +135 degrees and −135 degrees every scanning line.

In the PAL format of the VHS system, the color under frequency is 40.125 (40.125 $f_H$) times the horizontal scan frequency. Therefore, the sub-carrier frequency of 4.433619 MHz of the standard color signal is recorded after frequency converted into 40.125 $f_H$ which is about 627 kHz. However, there is no phase shift in the channel 1 while phase is delayed by 90 degrees every horizontal period, that is, every scanning line in the channel 2.

In order to remove cross-talk in the reproduced color under signal in the PAL format, the delay element of two horizontal periods is used and the color signal before delayed by the delay element and the color signal after delayed by two horizontal periods are arithmetically operated as mentioned above. Therefore, when the present invention is applied to the PAL system, the CCD 3 is set to provide a delay of two horizontal period.

On the other hand, there are N-PAL and M-PAL systems which are modifications of the PAL system. The following table shows the oscillation frequency of the VCO 12, the frequency dividing ratio of the frequency divider circuit 13, and the count of the counter 14 when the present invention is applied to these systems.

| System | Oscillation Frequency (fh) | Frequency Dividing Ratio | Count |
|---|---|---|---|
| 4.43 PAL | 1135/2 | 1/5 | 227 |
| 3.58 NTSC | 455 | 1/5 | 182 |
| N-PAL | 917/2 | 1/7 | 131 |
| M-PAL | 909/2 | 1/9 | 101 |

In FIG. 4, a whole VTR signal processing circuit according to the embodiment of the present invention corresponding to a reproducing mode is depicted. The reproduced luminance signal in the reproducing mode is demodulated to the original waveform frequency through a luminance reproducing process circuit 25. In this luminance reproducing process circuit 25, the horizontal sync signal fh is derived and supplied to a clock generator (CKG) circuit 22 for producing a clock signal for the CCD 3.

The color signal is reproduced from a head as a color under signal having frequency converted to a low frequency band, amplified by a pre-amplifier which is not shown and supplied to an ACC (Automatic Color Control) voltage controlled amplifier (ACC VGA) 24. The ACC VGA 24 and an ACC color detector (ACC DET) 23 for producing a control signal for the ACC VCA 24 control the burst signal level such that it becomes constant as in the recording time.

The color under signal whose burst signal level is made constant is frequency converted to the standard color signal by the first frequency converter circuit 1 as described previously. In the NTSC system, the color under signal is delayed by the CCD 3 which is the delay element of one horizontal period and supplied to the second frequency converter circuit 2, resulting in the standard color signal. The clock signal used in the delay operation of the CCD 3 is produced by the CKG circuit 22 such as shown in FIG. 1.

The CKG circuit 22 is constituted with the VCO 12, the frequency divider circuit 13, the counter circuit 14, the detect circuit 16, the error detector 15 and the capacitor 19, with the horizontal sync signal fh derived in the luminance reproducing process circuit 25 as a reference. A frequency generator circuit (FSG) 21 for generating the sub-carrier frequency reference signal used for the frequency conversion in the first and second frequency converter circuits 1 and 2 is constituted with the VXO 9, the phase detector circuit 8, the VCO 7, the frequency divider circuit 11, and the phase shifter circuit 6 shown in FIG. 1.

When the signals output from the first and second frequency converter circuits 1 and 2 are in phase, the cross-talk component contained in the converted output signal is cancelled by deriving a doubled cross-talk component by a subtraction in the arithmetic circuit 4, restoring the cross-talk component by attenuating it by −6 dB which is not described previously, in other word, reducing its level to ½ and subtracting it from one converted output signal. Alternatively, when the two converted output signals are inverted phase, cross-talk components which are in a inverted phase relation are cancelled out by adding the both signals. Since, in the latter case, the signal component level becomes twice by the addition, the original signal level is restored by attenuating it by −6 dB. Such level conversion function is included in the arithmetic circuit 4.

As another example of the above arithmetic circuit 4, it is possible to employ various embodiments in which, when the signals output from the first and second frequency converter circuits 1 and 2 are inverted phase, the cross-talk component contained in one of the output signals is cancelled by deriving a double cross-talk component by adding in the arithmetic circuit 4, restoring the cross-talk component by attenuating it by −6 dB, in other word, reducing its level to ½ to restore the cross-talk component and adding it from one converted output signal.

Unnecessary component of the standard color signal whose cross-talk is cancelled by the BPF 5, passed through a color killer 27, added to the luminance signal by an adder 28, and output as a composite signal. The ACC DET 23 detects the color signal from the BPF 5 and produces the control voltage of the ACC VCA 24.

The VTR system itself is constructed with a tuner portion, a VTR recording and reproducing signal processing portion, a recording and reproducing amplifier, a head portion, a mechanical portion, a system control portion, and a timer circuit and operation switches. The VTR signal processing circuit according to the present invention is included in a reproducing signal processing portion of the VTR recording and reproducing signal processing portion. Such VTR system itself as schematically described above is well known and, therefore, detailed description thereof is omitted.

The working and effects obtained by the above mentioned embodiment are as follow. That is, (1) Since, in the color signal processing circuit of the double frequency converter system, the clock generator circuit for generating the clock signal separated from the reproduced luminance signal, and synchronized with the horizontal sync signal is provided and the clock signal is used to perform the delaying operation of the delay circuit to thereby change the rotation speed of the drum motor when the operation of the system is shifted to a special reproducing operation. Therefore, the effect that, even when the frequency of the horizontal sync signal of the read out reproducing signal, it is possible to produce the clock signal following the frequency change to thereby produce the delay signal of 1H or 2H and, therefore, it is possible to stably perform the cross-talk cancel operation even when the system operation is shifted to the special reproducing mode is obtained. (2) The effect that the clock generator circuit can produce the clock signal exactly following the horizontal sync signal by controlling the oscillation frequency of the VCO circuit according to a result of the phase comparison between the first signal produced by dividing the frequency of the oscillation signal of the VCO circuit and the horizontal sync signal or the second signal obtained by dividing the horizontal sync signal frequency is obtained.

Although the present invention has been described in detail with reference to the embodiments, the present invention is not limited to these embodiments and it is needless to say that these embodiments can be modified in various ways unless these modifications are within the concept of the present invention. For example, the circuit for processing the luminance signal may be included in the semiconductor IC device constituting the VTR signal processing circuit. Such luminance circuit may operate such that the luminance signal is obtained by deriving a luminance signal component by a high pass filter and FM demodulating it by passing it through an equalizer, a drop out component and a limiter, etc. A signal component of the FM demodulation output may be derived a low pass filter, corrected its frequency band by de-emphasis and output as a video signal by passing through a noise reduction circuit and adding it to the color signal.

Since, in the VTR signal processing circuit, the whole color signal processing portion is constituted by an internal circuit, it is possible to make a VTR integrated with a camera which is compact and light weight compared with the case where the glass comb filter is used, by reducing the number of external terminals and removing larger size and expensive external parts. Further, since the color signal processing circuit can be constituted within the semiconductor IC, it is possible to perform a high quality signal processing. When the CCD is used as the delay circuit and is constituted with external parts, it is possible to obtain a VTR signal processing circuit which can be used for the PAL system as well as the NTSC system. Of course, the delay circuit composed of the CCD or of an analog to digital converter circuit, the shift register and a digital to analog converter circuit. The present invention can be used widely as the VTR signal processing circuit of the color under system.

Accordingly, in a VTR signal processing circuit including a frequency converter portion in which a first reproduced color under signal and a second reproduced color under signal obtained by delaying by one or two horizontal period in synchronism with a predetermined clock signal are supplied to a first and second frequency converter circuits, respectively, a frequency signal having frequency 2n times that of a carrier used in frequency conversion for converting a frequency of the reproduced color under signal into a frequency corresponding to a standard color signal is produced by an oscillator circuit. This oscillation frequency is divided such that it becomes the above mentioned carrier frequency. Four carriers having phases 0 degree, 90 degrees, 180 degrees, and 270 degrees respectively are produced. The four carriers are selectively output and supplied to the first frequency converter circuit and the second frequency converter circuit such that an output signal of the first converter circuit and an output signal of the second frequency converter circuit become in phase or inverted phase. A color cross-talk between adjacent tracks is cancelled by adding the both output signal or subtracting one of the output signals from the other. A clock generator circuit for generating a clock signal in synchronism with a horizontal sync signal separated from a reproduced luminance signal is provided and the delaying operation of the delay circuit is controlled by this clock signal. With this construction, even when the frequency of the horizontal sync signal of the read out reproducing signal, it is possible to produce the clock signal following the frequency change to thereby produce the delay signal of 1H or 2H. Therefore, it is possible to stably perform the cross-talk cancel operation even when the system operation is shifted to the special reproducing mode is obtained.

What is claimed is:

1. In a VTR (Video Tape Recorder) signal processing circuit comprising:
   a first frequency converter circuit for converting a first reproducing color under signal into a standard color signal;
   a delay circuit for delaying the first reproducing color under signal by one of one horizontal period and two horizontal periods in synchronism with a predetermined clock signal;
   a second frequency converter circuit for converting a second reproducing color under signal resulting from said delay circuit into a standard color signal;
   an oscillator circuit oscillating at a frequency 2n (n is a natural number) times a carrier frequency used in a frequency conversion of the reproducing color under signal into a frequency corresponding to a standard color signal; and
   a frequency divider circuit for dividing the oscillation frequency of said oscillator such that it becomes the carrier frequency and forming 4 carriers having phases 0 degree, 90 degrees, 180 degrees, and 270 degrees respectively,
   said VTR signal producing circuit further comprising a frequency conversion portion for making the output signal of said first frequency converter circuit and the output signal of said second frequency converter circuit into one of in phase and inverted phase by selectively supplying the carriers having four phases output from said frequency divider circuit to said first frequency converter circuit and said second frequency converter circuit and for canceling color cross-talk between tracks by one of subtracting and adding the both signals, the improvement of said VTR signal processing circuit comprising a clock signal generator responsive to a horizontal sync signal separated from a reproduced luminance signal for generating a clock signal synchronized with the horizontal sync signal of said reproduced luminance signal, wherein a delaying operation of said delay circuit is performed by said clock signal, and wherein said clock signal generator circuit generates the clock signal used for the delaying operation of said delay circuit by controlling the oscillation frequency of a voltage controlled oscillator circuit by a result of phase comparison between a first signal generated by frequency dividing the oscillation signal of said voltage controlled oscillator circuit and the horizontal sync signal of said reproduced luminance signal.

2. In a VTR signal processing circuit comprising:
   a first frequency converter circuit for converting a first reproducing color under signal into a standard color signal;
   a delay circuit for delaying the first reproducing color under signal by one of one horizontal period and two horizontal periods in synchronism with a predetermined clock signal;
   a second frequency converter circuit for converting a second reproducing color under signal resulting from said delay circuit into a standard color signal;
   an oscillator circuit oscillating at a frequency 2n (n is a natural number) times a carrier frequency used in a frequency conversion of the reproducing color under signal into a frequency corresponding to a standard color signal; and
   a frequency divider circuit for dividing the oscillation frequency of said oscillator such that it becomes the carrier frequency and forming 4 carriers having phases 0 degree, 90 degrees, 180 degrees, and 270 degrees respectively,
   said VTR signal producing circuit further comprising a frequency conversion portion for making the output signal of said first frequency converter circuit and the output signal of said second frequency converter circuit into one of in phase and inverted phase by selectively supplying the carriers having four phases output from said frequency divider circuit to said first frequency converter circuit and said second frequency converter circuit and for canceling color cross-talk between tracks by one of subtracting and adding the both signals, the improvement of said VTR signal processing circuit comprising a clock signal generator responsive to a horizontal sync signal separated from a reproduced luminance signal for generating a clock signal synchronized with the horizontal sync signal of said reproduced luminance signal, wherein a delaying operation of said delay circuit is performed by said clock signal, and wherein said clock signal generator circuit generates the clock signal used for the delaying operation of said delay circuit by controlling the oscillation frequency of a voltage controlled oscillator circuit by a result of phase comparison between a first signal generated by frequency dividing the oscillation signal of said voltage controlled oscillator circuit and the horizontal sync signal of said reproduced luminance signal.

3. A VTR signal processing circuit in accordance with claim 1, wherein said reproducing color under signal is a signal corresponding to the NTSC system, and said delay circuit is constructed with a CCD (Charge-Coupled Device) set to a delay time corresponding to one horizontal period, and said clock signal is set to a frequency signal 455 times that of the horizontal sync signal of said reproduced luminance signal.

4. A VTR signal processing circuit in accordance with claim 2, wherein said reproducing color under signal is a signal corresponding to the NTSC system, and said delay circuit is constructed with a CCD set to a delay time corresponding to one horizontal period, and said clock signal is set to a frequency signal 455 times that of the horizontal sync signal of said reproduced luminance signal.

* * * * *